June 11, 1940.　　　M. RADTKE　　　2,204,001
PRODUCTION OF WATER GAS
Filed Sept. 30, 1937
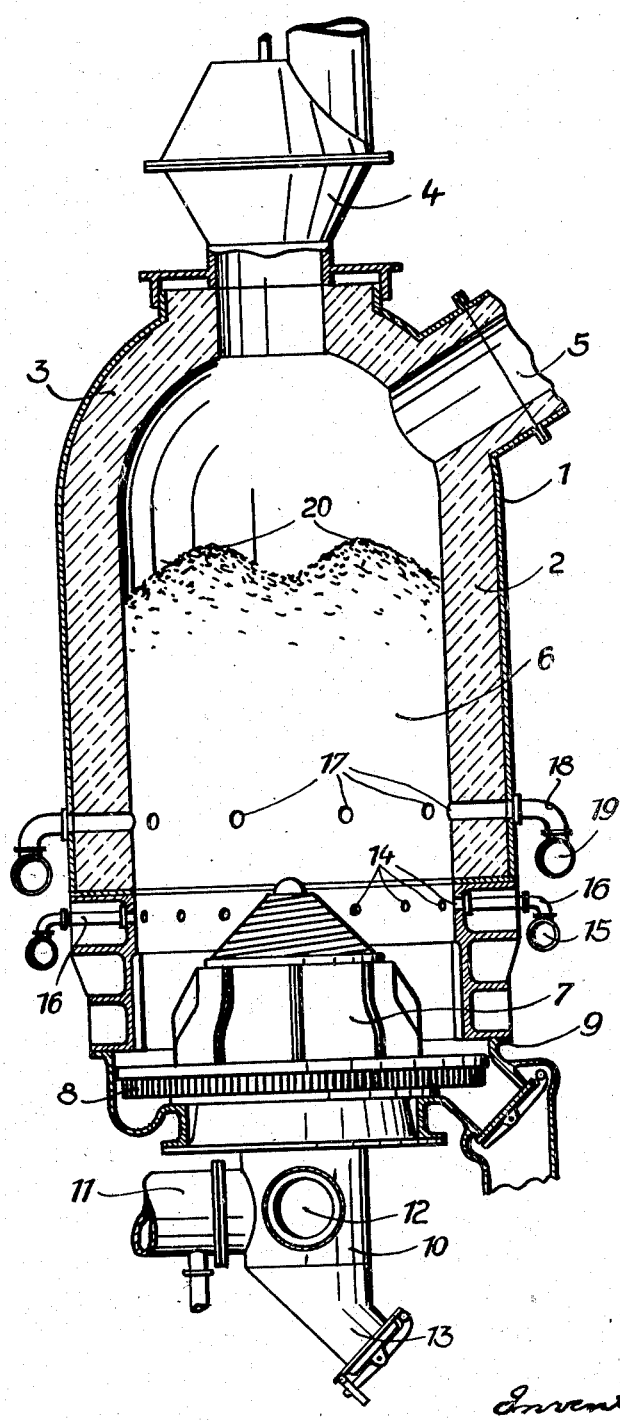
Inventor:
Max Radtke
By Henry Lour Clarke
his atty.

Patented June 11, 1940

2,204,001

UNITED STATES PATENT OFFICE 2,204,001

PRODUCTION OF WATER GAS

Max Radtke, Essen, Germany, assignor, by mesne assignments, to Koppers Company, Pittsburgh, Pa., a corporation of Delaware Application September 30, 1937, Serial No. 166,486
In Germany October 1, 1936

3 Claims. (Cl. 48—207)

The invention relates to the production of water gas, especially a water gas, which contains carbon monoxide and hydrogen in a proportion of essentially 1:2 or the like and more particularly to the production of water gas from coke or other suitable fuel which is poor in hydrocarbons or tarry constituents, for instance an anthracite, by reacting steam with the fuel within a gas generator, which previously has been heated-up to the temperature necessary for the desired reaction of the steam with the carbon of the fuel, by combustion of a part of the generator charge with air blown periodically into the generator.

In the ordinary water gas producers, the air necessary for blowing the fuel hot, is led through the generator charge from below upwards. After the generator charge has been heated-up to the temperature in this way, air is shut-off and steam is introduced into the generator, preferably downwardly in opposite direction to the air. The steam reacts with the carbon of the glowing coke and water gas is formed, which essentially consists of a mixture of hydrogen, carbon monoxide and carbon dioxide. A typical composition of a water gas produced according to the water gas processes, known hitherto, is the following (not considering the impurities, such as nitrogen, etc.):

| | Per cent |
|---|---|
| Hydrogen | 50 |
| Carbon monoxide | 40 |
| Carbon dioxide | 10 |

It is well-known that valuable hydrocarbons may be produced from carbon monoxide and hydrogen under a practically normal pressure and moderately increased temperature in the presence of certain catalysts, such as cobalt or nickel compounds. In order to obtain with this process valuable hydrocarbons in a sufficiently large quantity, the proportion of carbon monoxide to hydrogen in the basic gas, the so-called synthesis gas, should be as nearly as 1:2. Water gas produced by the usual water gas process is, therefore, not directly suitable for the synthesis of hydrocarbons according to the above mentioned synthesis process. A part of the carbon monoxide contained in the water gas has to be eliminated, for instance by conversion into carbon dioxide, which may then be wholly or partly extracted from the synthesis gas. Such a secondary treatment of the water gas is, however, troublesome and expensive.

The main object of the present invention is to improve the production of water gas from coke or the like in such a way that a water gas containing carbon monoxide and hydrogen in the proportion of 1:2 may be drawn-off the producer as useful gas, thus avoiding the aforesaid secondary treatment for the purpose of producing the 1:2 ratio.

The invention now consists in introducing regulable quantity of steam into the producer charge in a zone underneath the fuel column, i. e. practically into the so-called ash-bed, in addition to that quantity of steam which is led through the producer charge downwards, during the gasifying period of the water gas process.

Further objects and features of my invention may be taken from the following description of a preferred embodiment thereof on the lines of the accompanying drawing, showing a vertical section through the water gas producer built according to my invention.

The gas producer shown on the drawing is formed by an essentially cylindrical shaft-like jacket 1, built up of sheet-plate or another suitable material. The jacket 1 is lined with refractory brickwork 2. The roof 3 of the gas generator has the shape of a dome to which is arranged the fuel charging device 4 through which the fuel to be treated is introduced into the gas producer shaft, without the escape of gas from the gas generator. A more detailed description of this device is not necessary here, since all those skilled in the art, are well familiar with it.

From the roof 3 of the gas generator leads a pipe line 5, through which, on the one hand, are withdrawn the blow gases formed during the hot-blow period of the gas producer charge and, on the other hand, steam can be admitted from the top into the gas generator. The pipe line 5 is, therefore, connected with a waste gas main (chimney) and with a steam main (steam boiler) by means of suitable shut-off valves, which have however not been illustrated on the drawing.

The shaft 6, formed by the refractory brickwork 2 is open at the bottom. The lower end of the shaft 6 is fitted with a revolving grate 7, which is equipped with openings through which, on the one hand, the air for blowing hot the gas producer charge is introduced and, on the other hand, the water gas formed in the gas generator from steam and carbon is withdrawn.

The grate 7 is mounted on a revolving table 8 situated in a gas-tight casing 9 adjacent to the jacket 1. A pipe line 10 extends through the bottom of this casing 9. Said pipe line leads to the space underneath the grate 7 and is connected outside the gas generator, on the one hand, with the air main 11 and, on the other hand, with the water gas main 12 which is controlled by shut-off valves, not shown on the drawing. Finally, the pipe line 10 is fitted at its lowest point with a closeable opening 13, through which may be extracted the solid constituents, such as dust, accumulating there.

The method of operating the revolving grate 7 is as usual so that it will not be necessary here to give a detailed description.

Approximately at the level of the conical cover of the grate 7, a multitude of openings 14 are arranged in the wall of the gas generator. Pipe lines 16 lead to the annular distributing main 15 from each of such openings 14. The distributing main 15 is in connection with a steam line, not shown, however, on the drawing.

Above the openings 14 in the gas producer wall there is further provided a multitude of openings 17 which are connected by means of pipelines 18 with a second distributing main 19 which is connected to an air supply not shown on the drawing.

If the gas producer is charged with the fuel to be treated forming slopes, as illustrated at point 20 then after the firing of the fuel first of all air is blown into the producer charge through the grate and/or the openings 17 from below. The gas producer charge is thereby highly heated. As soon as the temperature has reached that point at which the steam reacts with carbon and water gas is formed with the desired velocity, the air valve and the chimney damper are closed, whereupon steam is introduced through the pipe line 5 from above into the gas producer charge. The steam flows through the gas producer charge downwards and comes into contact with the fuel, the temperatures of which increase towards the lower zone of the producer and by the reaction of steam with carbon, there is primarily formed a water gas of the before mentioned composition.

On its way downwards through the gas producer charge, such primary water gas reaches the zone of the steam openings 15, through which steam is introduced into the gas generator during this operating period. The gas producer charge in this zone essentially consists of ash and slag, only containing less carbon, but more minerals, especially iron compounds.

A part of the carbon monoxide contained in the primary water gas when coming into contact with these minerals is then converted secondarily with the steam freshly introduced through the openings 14 into carbonic acid, the quantity of carbon monoxide thus converted depends on the quantity of secondary steam, introduced through the openings, and on the temperature as well as on the composition of the minerals. The temperature in the ash bed may be advantageously kept near about 500° C.

By a favourable selection of these factors, the secondary conversion of the primarily produced water gas in the lower zone of the gas generator is carried out in such a way that a water gas is withdrawn through the pipe line 12, in which are present carbon monoxide and hydrogen in the desired proportion of one to two.

The effect is supported in that the reaction of

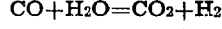

$$CO + H_2O = CO_2 + H_2$$

which takes place in the ash zone somewhat above the grate 7, is slightly exothermic.

If the slag does not contain any substances which accelerate the reaction stated before, it may be advantageous to introduce into the gas generator additional minerals together with the fuels, especially iron compounds, for instance slag from a Siemens-Martin steel oven.

If many water gas generators combined into one battery are operated, the composition of the gas can also be influenced in that several gas generators are run with the addition of secondary air into the ash-zone, according to the present invention, the remaining generators being worked without such an addition of secondary air and then the heat carrying gases produced in generators operated in this way, are combined with one another.

It is, of course, very essential for the success of the present invention that a sufficient layer of ash be maintained in the lower portion of the generator. The degree of control can be easily determined in the well-known manner of inserting iron bars from above into the gas generator for a certain time, said bars being heated differently according to the temperatures existing in the gas producer charge, and the position of the ash zone can be determined very easily from the iron bars.

The adaption of the invention to the practical operation is not limited to a gas generator such as illustrated on the attached drawing.

I have now described my present invention on the lines of a preferred embodiment thereof, but my invention is not limited in all its aspects to the mode of carrying it out as described and shown, since the invention may be variously embodied within the scope of the following claims.

I claim:

1. A method of generating water gas containing carbon monoxide and hydrogen in the ratio of 1:2 from solid carbonaceous fuel poor in hydrocarbons or tarry constituents in a water gas generator which comprises establishing a fuel bed of descending fuel aforesaid with supply of the fuel at the top of the bed and discharge of ash at the bottom of the bed, airblasting the fuel bed upwardly from the bottom through the ash in the lower zone of the fuel bed and withdrawing the resultant blast gases from the bed above the top of the same, then alternately passing down-run steam through the fuel bed from above the top of the bed to and withdrawing the down-run water gas generated thereby from the bed through the ash in the lower zone of the bed, and concurrently with the passing of down-run steam through the fuel bed, introducing secondary steam into the ash in the lower ash zone to convert part of the CO of the down-run water gas to $CO_2$, by reaction of the CO with the secondary steam in the presence of minerals in the ash, and in amount to produce a ratio CO to H in the proportion of 1:2 in the final down-run water gas leaving the ash zone in the lower part of the fuel bed.

2. A method of generating water gas containing carbon monoxide and hydrogen in the ratio of 1:2 from solid carbonaceous fuel poor in hydrocarbons or tarry constituents in a water gas generator which comprises establishing a fuel bed of descending fuel aforesaid with supply of the fuel at the top of the bed and discharge of ash at the bottom of the bed, airblasting the fuel bed upwardly from the bottom through the ash in the lower zone of the fuel bed and withdrawing the resultant blast gases from the bed above the top of the same, then alternately passing down-run steam through the fuel bed from above the top of the bed to and withdrawing the down-run water gas generated thereby from the bed through the ash in the lower zone of the bed, and concurrently with the passing of down-run steam through the fuel bed, introducing secondary steam into the ash in the lower ash zone to convert part of the CO of the down-run water-gas to $CO_2$, by reaction of the CO with the secondary steam in the presence of minerals in the ash, and in amount to produce a predetermined ratio of CO:H in the final down-run water gas leaving the ash zone in the lower part of the fuel bed.

3. A method of generating water gas containing carbon monoxide and hydrogen in the ratio of 1:2 from solid carbonaceous fuel poor in hydrocarbons or tarry constituents in a water gas generator which comprises establishing a fuel bed of descending fuel aforesaid with supply of the fuel at the top of the bed and discharge of ash at the bottom of the bed, air-blasting the fuel bed upwardly from the bottom through the ash in the lower zone of the fuel bed, while concurrently introducing auxiliary air into the fuel bed at a level above the ash zone, and withdrawing the resultant blast gases from the bed above the top of the same, then alternately passing down-run steam through the fuel bed from above the top of the bed to and withdrawing the down-run water gas generated thereby from the bed through the ash in the lower zone of the bed, and concurrently with the passing of down-run steam through the fuel bed, introducing secondary steam into the ash in the lower ash zone to convert part of the CO of the down-run water gas to $CO_2$, by reaction of the CO with the secondary steam in the presence of minerals in the ash, and in amount to produce a ratio of CO to H in the proportion of 1:2 in the final down-run water gas leaving the ash zone in the lower part of the fuel bed.

MAX RADTKE.